Patented Oct. 15, 1935

2,017,595

UNITED STATES PATENT OFFICE 2,017,595

INSECTICIDE

Charles B. Gnadinger, Minneapolis, Minn.

No Drawing. Application February 4, 1935,
Serial No. 4,984

9 Claims. (Cl. 167—14)

This invention relates to the production of substances for killing red spiders and their eggs and has, among its objects, to provide substances which, although well adapted for general use are particularly adapted for use on delicate plants, and are also adapted to kill spiders and their eggs without damage to the plant, whatever the stage of growth of the plant. The invention also relates to and is applied to the production of substances for killing insects in general, including red spiders and other similar mites and also including aphids, leaf rollers, cyclamen mites, mealy bugs and others.

This application is a continuation in part of my copending application for Insecticides, Serial Number 587,147.

The red spider (Tetranychus telarius L.) probably causes more serious damage to a larger number of species of plants than almost any other greenhouse pest. Many compounds have been recommended for exterminating, or controlling red spiders. However, these compounds either do not kill the spider, or if they do kill, also damage the plants. The red spider seems peculiarly immune to contact insecticides which readily kill insects such as potato beetles, Japanese beetles, cockroaches, tarnished plant bugs, etc. Mechanical methods, such as spraying with cold water under high pressure, are not very effective, and generally cannot be applied when most needed, because of the damage to the plants or danger of fungicidal diseases. The present invention provides substances which are extremely efficient and which do not injure the plants in any way. Moreover, the discovered products, herein disclosed, do not require high pressure spraying. This is of particular advantage where the control is for plants such as gladioli, asters, carnations, mums, or any delicate plant.

It is believed that the desired action for all purposes herein is principally due to the presence of selenium. The element selenium is closely chemically related to sulphur and dissolves in alkaline sulphide solutions forming complex alkaline sulpho-selenides.

The use of calcium and barium seleno-sulphides is objectionable because they are more caustic than sodium-ammonium or potassium-ammonium seleno-sulphides, and a soap spreader cannot be used with them, because the soap is precipitated. Therefore, when those substances are used, it is necessary, in order to get a kill, to use so much caustic that the plants are injured.

As a quantitative example for carrying out the invention, proceed as follows: Saturate 19 pounds of ammonium hydroxide solution containing 28% ammonia, with hydrogen sulfide; add one-half pound of selenium and shake until dissolved, and then dilute to 5 gallons with water. To prepare a finished spray for killing red spiders, dilute 1 gallon of above with 100 to 800 gallons of water.

There is no intention to limit the invention entirely to the above specific formula, although this formula is also claimed. It is also to be understood that the amount of selenium can be varied within the limits of solubility. Moreover, the amounts of ammonium and selenium given above, can be varied somewhat, and additional ammonia can also be added after saturating with hydrogen sulphide.

About .2 gram of soap per 100 cc. of diluted liquid spray is used as a spreader. It is to be noted that the use of too much soap or spreader will result in injury and/or burning of the plants. The use of about one-half an ounce of soap to the gallon gives a perfect covering on the leaves of carnations, gladioli, or similar foliages, which are not thoroughly wetted by oil emulsions. Soap has the advantage of not removing the "bloom" from the leaves of carnations, blue spruce and similar foliages.

I claim as my invention:

1. An insecticide containing ammonium seleno-sulphide.

2. A process for making a substance of the nature described which consists, in adding hydrogen sulphide to an ammonium hydroxide solution, and then adding selenium.

3. A process for making a substance of the nature described which consists, in saturating ammonium hydroxide solution with hydrogen sulphide, adding selenium and shaking until dissolved.

4. A process for making a substance of the nature described which consists in saturating ammonium hydroxide solution with hydrogen sulphide, adding selenium and shaking until dissolved, then diluting with water.

5. A process for making a substance of the nature described which consists, in adding hydrogen sulphide to an ammonium hydroxide solution, adding additional ammonia, and then adding selenium.

6. A process for making a substance of the nature described which consists, in saturating ammonium hydroxide solution with hydrogen sulphide, adding additional ammonia, then adding selenium.

7. A process for making a substance of the nature described which consists, in saturating ammonium hydroxide solution with hydrogen sulphide, adding additional ammonia, adding selenium, shaking until dissolved, and then diluting with water.

8. A process for making the substance described which consists, in saturating approximately nineteen pounds of ammonium hydroxide solution containing approximately 28% ammonium with hydrogen sulphide, then adding approximately one-half pound of selenium and shaking until dissolved, then diluting to approximately 5 gallons, with water.

9. A process for making the substance described which consists, in saturating approximately 19 pounds of ammonium hydroxide solution containing approximately 28% ammonium with hydrogen sulphide, then adding approximately one-half pound of selenium and shaking until dissolved, then diluting to approximately 5 gallons, with water, and finally diluting approximately 1 gallon of the above product with approximately 100 to 800 gallons of water.

CHARLES B. GNADINGER.